US010108927B2

(12) United States Patent
Motgi et al.

(10) Patent No.: US 10,108,927 B2
(45) Date of Patent: Oct. 23, 2018

(54) METHOD AND SYSTEM FOR ENHANCING USER EXPERIENCE ON A WEB CONTENT PAGE BY CATEGORIZING CONTACTS AND RELEVANT POSTS

(75) Inventors: Amit Motgi, Santa Clara, CA (US); Ali Satter, San Jose, CA (US)

(73) Assignee: OATH INC., New York, NY (US)

( * ) Notice: Subject to any disclaimer, the term of this patent is extended or adjusted under 35 U.S.C. 154(b) by 196 days.

(21) Appl. No.: 13/300,552

(22) Filed: Nov. 19, 2011

(65) Prior Publication Data

US 2013/0132475 A1 May 23, 2013

(51) Int. Cl.
*G06F 15/16* (2006.01)
*G06Q 10/10* (2012.01)
*G06Q 50/00* (2012.01)
*G06F 17/30* (2006.01)

(52) U.S. Cl.
CPC ....... *G06Q 10/10* (2013.01); *G06F 17/30038* (2013.01); *G06Q 50/01* (2013.01)

(58) Field of Classification Search
USPC ....................................... 709/203, 204, 217
See application file for complete search history.

(56) References Cited

U.S. PATENT DOCUMENTS

| | | | |
|---|---|---|---|
| 2011/0035673 A1* | 2/2011 | Chou | G06F 15/16 715/739 |
| 2011/0154223 A1* | 6/2011 | Whitnah et al. | 715/753 |
| 2012/0005224 A1* | 1/2012 | Ahrens | G06Q 10/10 707/769 |
| 2012/0066212 A1* | 3/2012 | Jennings | G06F 17/30144 707/723 |
| 2013/0055101 A1* | 2/2013 | Sabur | G06Q 10/10 715/739 |

* cited by examiner

*Primary Examiner* — Joseph E Avellino
*Assistant Examiner* — Marshall M McLeod
(74) *Attorney, Agent, or Firm* — James J. DeCarlo; Greenberg Traurig, LLP

(57) ABSTRACT

A method and system for enhancing user experience on a web content page. The method includes extracting a list of contacts of a user from one or more networking websites based on a relationship level. The method also includes analyzing a plurality of posts generated by the list of contacts. The method further includes categorizing each contact in the list of contacts and the plurality of posts under one or more web content topics. Moreover, the method includes displaying, to the user, one or more contacts along with a set of posts relevant to a web content topic on the web content page. The system includes one or more electronic devices, a communication interface, a memory, and a processor.

18 Claims, 5 Drawing Sheets

METHOD AND SYSTEM FOR ENHANCING USER EXPERIENCE ON A WEB CONTENT PAGE BY CATEGORIZING CONTACTS AND RELEVANT POSTS

TECHNICAL FIELD

Embodiments of the disclosure relate to the field of enhancing user experience on a web content page.

BACKGROUND

Users of different networking websites, for example Facebook and Twitter, have multiple contacts. Such contacts keep posting a plurality of posts on the networking websites, the posts being associated with different topics, categories, and taxonomies. However, given a web content topic, it is currently difficult to identify and categorize the contacts and associated posts. Thereby, it is difficult to provide a relevant user experience when a user views an article, a photo, or a video on a web content page. As a result, the user is usually unsatisfied and can go in search of other web content pages.

In the light of the foregoing discussion, there is a need for a method and system for an efficient technique to enhance user experience on the web content page by categorizing and displaying contacts and relevant posts.

SUMMARY

The above-mentioned needs are met by a method, a computer program product and a system for enhancing user experience on a web content page.

An example of a method of enhancing user experience on a web content page includes extracting a list of contacts of a user from one or more networking websites based on a relationship level. The method also includes analyzing a plurality of posts generated by the list of contacts. The method further includes categorizing each contact in the list of contacts and the plurality of posts under one or more web content topics. Moreover, the method includes displaying, to the user, one or more contacts along with a set of posts relevant to a web content topic on the web content page.

An example of a computer program product stored on a non-transitory computer-readable medium that when executed by a processor, performs a method of enhancing user experience on a web content page includes extracting a list of contacts of a user from one or more networking websites based on a relationship level. The computer program product also includes analyzing a plurality of posts generated by the list of contacts. The computer program product further includes categorizing each contact in the list of contacts and the plurality of posts under one or more web content topics. Moreover, the computer program product includes displaying, to the user, one or more contacts along with a set of posts relevant to a web content topic on the web content page.

An example of a system for enhancing user experience on a web content page includes one or more electronic devices. The system also includes a communication interface in electronic communication with the one or more electronic devices. The system further includes a memory that stores instructions. Further, the system includes a processor responsive to the instructions to extract a list of contacts of a user from one or more networking websites based on a relationship level, to analyze a plurality of posts generated by the list of contacts, to categorize each contact in the list of contacts and the plurality of posts under one or more web content topics, and to display, to the user, one or more contacts along with a set of posts relevant to a web content topic on the web content page.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION OF THE EMBODIMENTS

The above-mentioned needs are met by a method, computer program product and system for enhancing user experience on a web content page. The following detailed description is intended to provide example implementations to one of ordinary skill in the art, and is not intended to limit the invention to the explicit disclosure, as one or ordinary skill in the art will understand that variations can be substituted that are within the scope of the invention as described.

Figure 1:
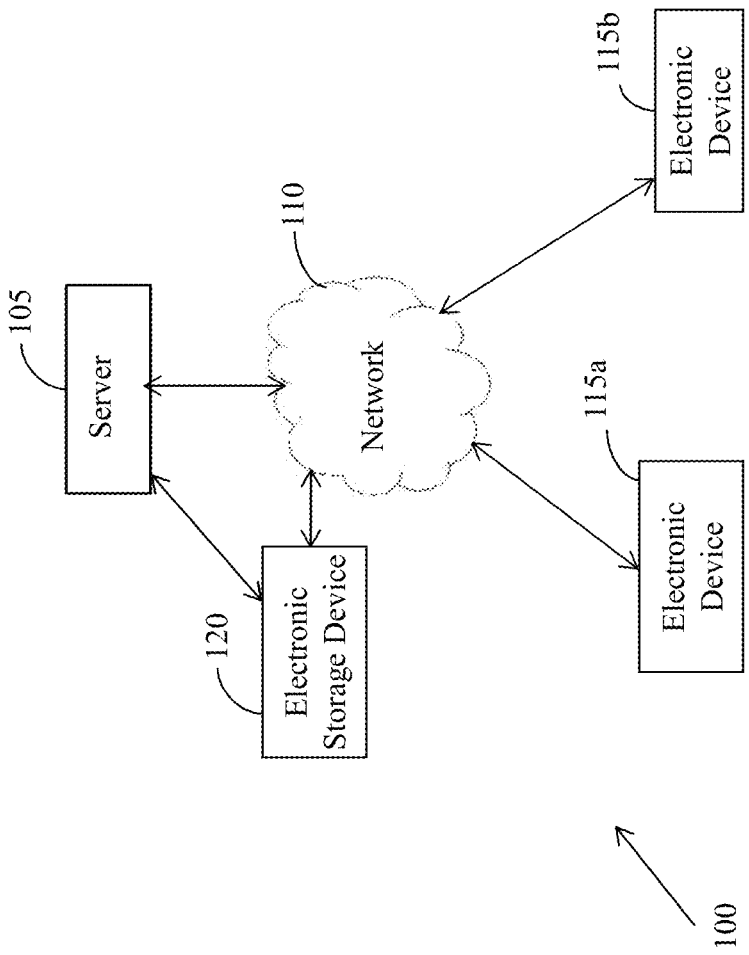
FIG. 1 is a block diagram of an environment, in accordance with which various embodiments can be implemented.

FIG. 1 is a block diagram of an environment 100, in accordance with which various embodiments can be implemented.

The environment 100 includes a server 105 connected to a network 110. The environment 100 further includes one or more electronic devices, for example an electronic device 115a and an electronic device 115b, which can communicate with each other through the network 110. Examples of the electronic devices include, but are not limited to, computers, mobile devices, laptops, palmtops, hand held devices, telecommunication devices, and personal digital assistants (PDAs).

The electronic devices can communicate with the server 105 through the network 110. Examples of the network 110 include, but are not limited to, a Local Area Network (LAN), a Wireless Local Area Network (WLAN), a Wide Area Network (WAN), internet, and a Small Area Network (SAN). The electronic devices associated with different users can be remotely located with respect to the server 105.

The server 105 is also connected to an electronic storage device 120 directly or via the network 110 to store information, for example a list of contacts of a user, a plurality of posts, and one or more web content topics.

In some embodiments, different electronic storage devices are used for storing the information.

A user of an electronic device, for example the electronic device 115a, provides login information of one or more networking websites and subsequently views an article, a photo, or a video on a web content page. One or more contacts, in a list of contacts of the user, along with a set of posts relevant to a web content topic of the article, the photo, or the video, are displayed to the user. The one or more contacts, extracted from the networking websites, have been categorized under the web content topic after analysis. The user can respond to the set of posts with one or more posts. The user can also tag the one or more posts such that when the user later visits the web content page, the one or more posts of the user and the set of posts are retrieved based on the tag. The server 105, for example a Yahoo!® server, is used to extract the list of contacts of the user, analyze a plurality of posts generated by the list of contacts, categorize each contact in the list of contacts and the plurality of posts under one or more web content topics, and display, to the user, the one or more contacts along with the set of posts relevant to the web content topic on the web content page. The electronic storage device 120 can store the list of contacts of the user, the plurality of posts, and the one or more web content topics.

Figure 2:
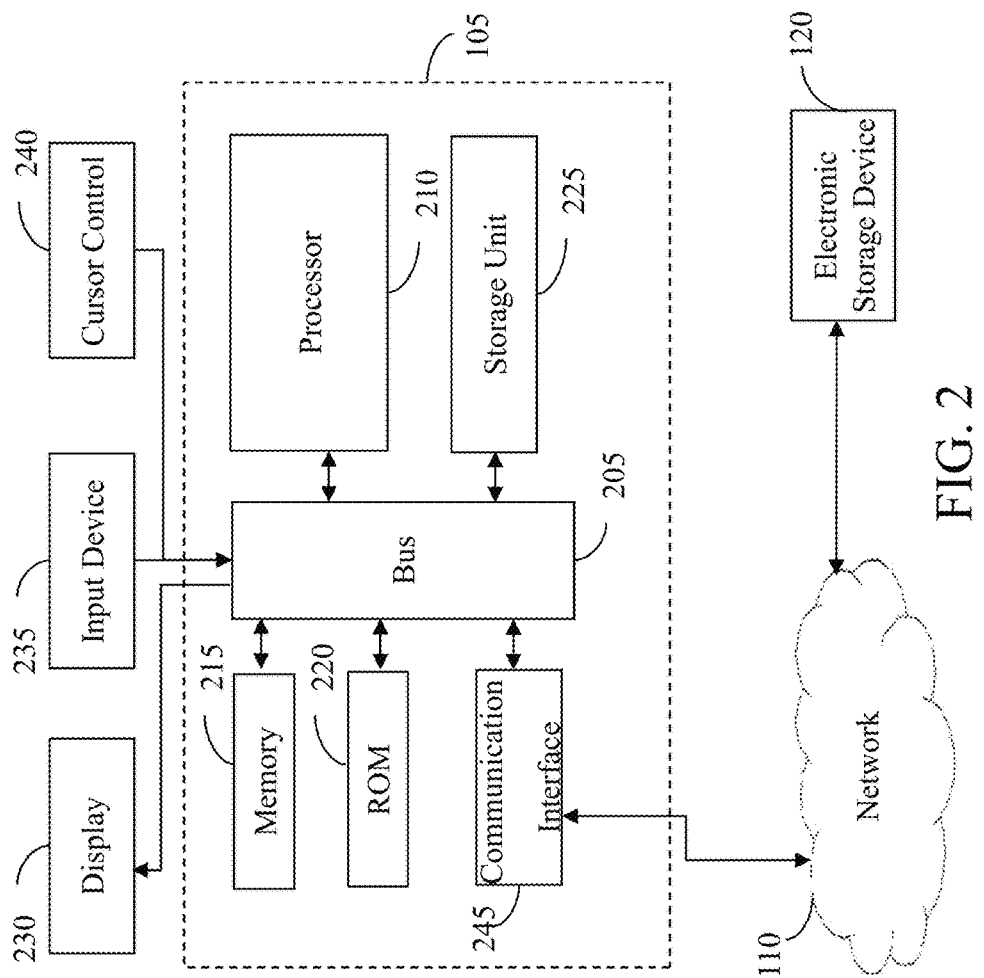
FIG. 2 is a block diagram of a server, in accordance with one embodiment.

The server 105 including a plurality of elements is explained in detail in conjunction with FIG. 2.

FIG. 2 is a block diagram of the server 105, in accordance with one embodiment.

The server 105 includes a bus 205 or other communication mechanism for communicating information, and a processor 210 coupled with the bus 205 for processing information. The server 105 also includes a memory 215, for example a random access memory (RAM) or other dynamic storage device, coupled to the bus 205 for storing information and instructions to be executed by the processor 210. The memory 215 can be used for storing temporary variables or other intermediate information during execution of instructions by the processor 210. The server 105 further includes a read only memory (ROM) 220 or other static storage device coupled to the bus 205 for storing static information and instructions for the processor 210. A storage unit 225, for example a magnetic disk or optical disk, is provided and coupled to the bus 205 for storing information, for example the list of contacts of the user, the plurality of posts, and the one or more web content topics.

The server 105 can be coupled via the bus 205 to a display 230, for example a cathode ray tube (CRT), and liquid crystal display (LCD) for displaying, to the user, the one or more contacts along with the set of posts relevant to the web content topic on the web content page. An input device 235, including alphanumeric and other keys, is coupled to bus 205 for communicating information and command selections to the processor 210. Another type of user input device is a cursor control 240, for example a mouse, a trackball, or cursor direction keys for communicating direction information and command selections to the processor 210 and for controlling cursor movement on the display 230. The input device 235 can also be included in the display 230, for example a touch screen.

Various embodiments are related to the use of the server 105 for implementing the techniques described herein. In some embodiments, the techniques are performed by the server 105 in response to the processor 210 executing instructions included in the memory 215. Such instructions can be read into the memory 215 from another machine-readable medium, for example the storage unit 225. Execution of the instructions included in the memory 215 causes the processor 210 to perform the process steps described herein.

In some embodiments, the processor 210 can include one or more processing units for performing one or more functions of the processor 210. The processing units are hardware circuitry used in place of or in combination with software instructions to perform specified functions.

The term "machine-readable medium" as used herein refers to any medium that participates in providing data that causes a machine to perform a specific function. In an embodiment implemented using the server 105, various machine-readable media are involved, for example, in providing instructions to the processor 210 for execution. The machine-readable medium can be a storage medium, either volatile or non-volatile. A volatile medium includes, for example, dynamic memory, such as the memory 215. A non-volatile medium includes, for example, optical or magnetic disks, for example the storage unit 225. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic media, a CD-ROM, a DVD, a Blu-ray disc, any other optical media, punchcards, paper-tape, any other physical media with patterns of holes, a RAM, a PROM, and EPROM, a FLASH-EPROM, any other memory chip or cartridge.

In another embodiment, the machine-readable media can be transmission media including coaxial cables, copper wire and fiber optics, including the wires that comprise the bus 205. Transmission media can also take the form of acoustic or light waves, such as those generated during radio-wave and infra-red data communications. Examples of machine-readable media may include, but are not limited to, a carrier wave as described hereinafter or any other media from which the server 105 can read, for example online software, download links, installation links, and online links. For example, the instructions can initially be carried on a magnetic disk of a remote computer. The remote computer can load the instructions into its dynamic memory and send the instructions over a telephone line using a modem. A modem local to the server 105 can receive the data on the telephone line and use an infra-red transmitter to convert the data to an infra-red signal. An infra-red detector can receive the data carried in the infra-red signal and appropriate circuitry can place the data on the bus 205. The bus 205 carries the data to the memory 215, from which the processor 210 retrieves and executes the instructions. The instructions received by the memory 215 can optionally be stored on the storage unit 225 either before or after execution by the processor 210. All such media must be tangible to enable the instructions carried by the media to be detected by a physical mechanism that reads the instructions into a machine.

The server 105 also includes a communication interface 245 coupled to the bus 205. The communication interface 245 provides a two-way data communication coupling to the network 110. For example, the communication interface 245 can be an integrated services digital network (ISDN) card or a modem to provide a data communication connection to a corresponding type of telephone line. As another example, the communication interface 245 can be a local area network (LAN) card to provide a data communication connection to a compatible LAN. Wireless technologies, for example third generation (3G) and fourth generation (4G) long term evolution, can be used. Wireless links can also be implemented. In any such implementation, the communication interface 245 sends and receives electrical, electromagnetic or optical signals that carry digital data streams representing various types of information.

The server 105 is also connected to the electronic storage device 120 to store the list of contacts of the user, the plurality of posts, and the one or more web content topics.

The processor 210 in the server 105, for example a Yahoo!® server, extracts the list of contacts of the user from one or more networking websites based on a relationship level. The processor 210 analyzes a plurality of posts generated by the list of contacts. The processor 210 further categorizes each contact in the list of contacts and the plurality of posts under one or more web content topics. The processor 210 then displays, to the user, one or more contacts along with a set of posts relevant to a web content topic on the web content page. The user can then respond to the set of posts with one or more posts by tagging the one or more posts. The processor 210 can also retrieve the set of posts along with the one or more posts of the user, based on the tagging, when the user later visits the article page.

Figure 3:
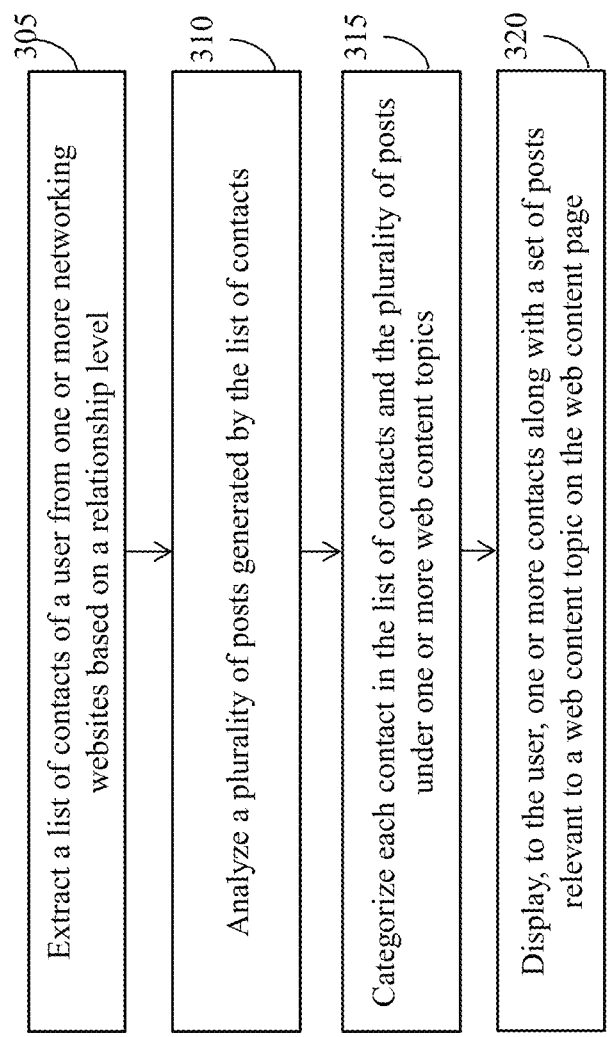
FIG. 3 is a flowchart illustrating a method of enhancing user experience on a web content page, in accordance with one embodiment.

FIG. 3 is a flowchart illustrating a method of enhancing user experience on a web content page, in accordance with one embodiment. A web content page can be defined as a web page that includes one or more of an article, a photo, and a video.

At step 305, a list of contacts of a user is extracted from one or more networking websites based on a relationship level. In one example, the relationship level of the list of contacts can be friends following the user. The list of contacts is extracted from the networking websites by a server, for example the server 105. When the user of an electronic device, for example the electronic device 115a, visits the web content page to view the article, the photo, or the video, the user provides login information of the networking websites. By providing the login information, the user also allows access to personal information present on the networking websites.

At step 310, a plurality of posts generated by the list of contacts is analyzed. Posts can be defined as messages posted on a networking website in association with a topic of conversation. In some embodiments, the plurality of posts generated by the list of contacts can be made available for analysis using a search algorithm.

At step 315, each contact in the list of contacts and the plurality of posts are categorized under one or more web content topics. In some embodiments, an algorithm can be used to categorize the plurality of posts. Examples of the web content topics include, but are not limited to, sports, business, politics, health, science, tech, travel and entertainment.

In some embodiments, the plurality of posts is extracted and categorized using one or more key terms in the web content page. Key terms are words or phrases that are important in defining the article, the photo, or the video. The plurality of posts can be filtered out from a single networking website or multiple networking websites. In some embodiments, the key terms can be extracted using a term extraction application programming interface (API), for example Yahoo!@ Term Extraction API, through a query language, for example Yahoo!® Query Language (YQL).

The list of contacts, the plurality of posts, and the web content topics can be stored at the server or an electronic storage device, for example the electronic storage device 120, and is retrieved as required. In one example, the server can be a centralized server or a distributed server of Yahoo!®.

At step 320, one or more contacts along with a set of posts relevant to a web content topic are displayed to the user on the web content page. Hence, when the user of the electronic device visits the web content page to view the article, the photo or the video, the user can also view the one or more contacts and the set of posts relevant to the web content topic.

In some embodiments, the set of posts are displayed in extensible markup language (XML) format, in hypertext markup language (HTML) format, or in JavaScript Object Notation (JSON) format.

In some embodiments, the user can respond to the set of posts with one or more posts, which can further be posted to at least one of the web content page and the networking website. The web content page or the networking website is then updated with the one or more posts of the user.

In some embodiments, the user can also tag the one or more posts. The one or more posts and the set of posts are then retrieved when the user later visits the article page. In one example, the user inserts a hash-tag at end of a post.

Figure 4:
FIG. 4 is an exemplary representation of a web content page, in accordance with one embodiment.

FIG. 4 is an exemplary representation of a web content page, in accordance with one embodiment. A user visits the web content page on Yahoo!® to read an article on business titled 'Asia shares drift up, euro steady before ECB'. The user provides login information of one or more networking websites, for example Facebook and Twitter, before reading the article. A server, for example the Yahoo!® server, extracts a list of contacts of the user from the networking websites based on a relationship level. The server also analyzes a plurality of posts generated by the list of contacts. Based on analysis, each contact in the list of contacts and the plurality of posts are categorized under one or more web content topics, for example business, sports, politics, health, science, tech, travel and entertainment. Depending on the article which the user chooses to read, one or more contacts, for example business friends legosocial and mark_hayward, along with a set of posts relevant to a web content topic of business are displayed to the user on the web content page. The user can then respond to the set of posts with one or more posts. The user can also tag the one or more posts of the web content topic business using a hash-tag, for example #yb (Yahoo business), such that when the user later visits the web content page, the one or more posts of the user and the set of posts are retrieved based on the hash-tag. The user can further view an updated web content page with the article, the one or more contacts, the one or more posts, and the set of posts. In another example, the web content page can include a photo or a video instead of the article.

Figure 5:
FIG. 5 is an exemplary representation of a web page, in accordance with one embodiment.

FIG. 5 is an exemplary representation of a web page, in accordance with one embodiment. A user visits Yahoo!® in order to read an article. The user can view images of multiple articles along with web content topics, for example politics, business, sports, entertainment, tech, science, travel, and health. The user can also view one or more contacts associated with each web content topic. The user can further choose a desired article, for reading, by providing a click input on a web content topic. The web content page including the article along with one or more contacts and a set of posts relevant to the web content topic are displayed to the user. The user can respond to the set of posts with one or more posts that are tagged. Based on tagging, the one or more posts and the set of posts are retrieved when the user later visits the article page.

The present disclosure enhances user experience on a web content page by displaying one or more contacts along with a set of posts relevant to a web content topic on the web content page. The present disclosure enables users to view posts relevant to the web content topic of an article, a photo, or a video. The present disclosure also provides a contextually relevant and engaging experience to the user by displaying the set of posts from one or more networking websites on the web content page itself. Revenue can also be increased due to increased engagement, increased page views due to traffic recirculation, and increased time spent on Yahoo!®.

It is to be understood that although various components are illustrated herein as separate entities, each illustrated component represents a collection of functionalities, which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

What is claimed is:

1. A method comprising:
   determining, by a processor, that a user has visited a web content page, the web content page including at least one key term;
   extracting, by the processor, a list of contacts of a user from one or more networking websites based on a relationship level;
   analyzing, by the processor, a plurality of posts generated by the list of contacts;
   categorizing, by the processor, using a key term in the web content page, the plurality of posts under one or more web content topics on the web content page;
   categorizing, by the processor, using a key term in the web content page, the list of contacts under the one or more web content topics;
   identifying, by the processor, a filtered list of contacts, each contact in the filtered list of contacts being associated with the topic of the web content page;
   identifying, by the processor, a filtered list of posts, each post in the filtered list of posts being associated with the topic of the web content page;
   displaying, to the user by the processor, one or more images representing one or more contacts in the filtered list of contacts along with the filtered list of posts, the one or more images and filtered list of posts displayed within the web content page;
   tagging, by the processor, a post in the filtered list of posts by associating a hashtag and characters received from the user with the post;
   retrieving, by the processor, a new filtered list of posts and a new filtered list of contacts when the user later visits the web content page; and
   retrieving, by the processor, the one or more posts of the user associated with the hashtag when the user later visits the web content page.

2. The method as claimed in claim 1 and further comprising enabling the user to provide login information of the one or more networking websites.

3. The method as claimed in claim 1 and further comprising enabling the user to respond to the set of posts with one or more posts.

4. The method as claimed in claim 3, wherein enabling the user to respond to the set of posts comprises tagging the one or more posts of the user.

5. The method as claimed in claim 3 and further comprising updating the web content page with the one or more contacts, the one or more posts, and the set of posts, the web content page comprising one or more of an article, a photo, and a video.

6. The method as claimed in claim 3, wherein enabling the user to respond to the set of posts comprises posting the one or more posts to at least one of the web content page and a networking website.

7. The method as claimed in claim 1, wherein the plurality of posts is filtered from one of a single networking website and multiple networking websites.

8. A non-transitory computer-readable storage medium that when executed by a processor, performs a method of enhancing user experience on a web content page, comprising:
   determining, by the processor, that a user has visited a web content page, the web content page including at least one key term;
   extracting, by the processor, a list of contacts of a user from one or more networking websites based on a relationship level;
   analyzing, by the processor, a plurality of posts generated by the list of contacts;
   categorizing, by the processor, using a key term in the web content page, the plurality of posts under one or more web content topics on the web content page;

categorizing, by the processor, using a key term in the web content page, the list of contacts under the one or more web content topics;

identifying, by the processor, a filtered list of contacts, each contact in the filtered list of contacts being associated with the topic of the web content page;

identifying, by the processor, a filtered list of posts, each post in the filtered list of posts being associated with the topic of the web content page;

displaying, to the user by the processor, one or more images representing one or more contacts in the filtered list of contacts along with the filtered list of posts, the one or more images and filtered list of posts displayed within the web content page;

tagging, by the processor, a post in the filtered list of posts by associating a hashtag and characters received from the user with the post;

retrieving, by the processor, a new filtered list of posts and a new filtered list of contacts when the user later visits the web content page; and retrieving, by the processor, the one or more posts of the user associated with the hashtag when the user later visits the web content page.

9. The medium as claimed in claim 8 and further comprising enabling the user to provide login information of the one or more networking websites.

10. The medium as claimed in claim 8 and further comprising enabling the user to respond to the set of posts with one or more posts.

11. The medium as claimed in claim 10, wherein enabling the user to respond to the set of posts comprises tagging the one or more posts of the user.

12. The medium as claimed in claim 10 and further comprising updating the web content page with the one or more contacts, the one or more posts, and the set of posts, the web content page comprising one or more of an article, a photo, and a video.

13. The medium as claimed in claim 10, wherein enabling the user to respond to the set of posts comprises posting the one or more posts to at least one of the web content page and a networking website.

14. The medium as claimed in claim 8, wherein the plurality of posts is filtered from one of a single networking website and multiple networking websites.

15. A system comprising:
a processor;
a storage medium for tangibly storing thereon program logic for execution by the processor, the stored program logic comprising:
  determining logic executed by the processor, for determining that a user has visited a web content page, the web content page including at least one key term;
  contact list extracting logic executed by the processor for extracting a list of contacts of a user from one or more networking websites based on a relationship level;
  post analyzing logic executed by the processor for analyzing a plurality of posts generated by the list of contacts;
  post categorizing logic executed by the processor for categorizing, using a key term in a web content page, the plurality of posts under one or more web content topics on the web content page;
  contact categorizing logic executed by the processor for categorizing, using a key term in the web content page, the list of contacts under the one or more web content topics;
  contact identifying logic executed by the processor for identifying a filtered list of contacts, each contact in the filtered list of contacts being associated with the topic of the web content page;
  post identifying logic executed by the processor for identifying a filtered list of posts, each post in the filtered list of posts being associated with the topic of the web content page;
  display logic executed by the processor for displaying, to the user, one or more images representing one or more contacts in the filtered list of contacts along with the filtered list of posts, the one or more images and filtered list of posts displayed within the web content page;
  tagging logic, executed by the processor, for tagging a post in the filtered list of posts by associating a hashtag and characters received from the user with the post; and
  first retrieving logic executed by the processor for retrieving a new filtered list of posts and a new filtered list of contacts when the user later visits the web content page; and
  second retrieving logic executed by the processor for retrieving, the one or more posts of the user associated with the hashtag when the user later visits the web content page.

16. The system as claimed in claim 15, further comprising login instruction providing logic executed by the processor for enabling the user to provide login information of the one or more networking websites.

17. The system as claimed in claim 15, further comprising post responding logic executed by the processor for enabling the user to respond to the set of posts with one or more posts.

18. The system as claimed in claim 17 and further comprising an electronic storage device that stores the list of contacts of the user, the plurality of posts, and the one or more web content topics.

* * * * *